Figure 1:
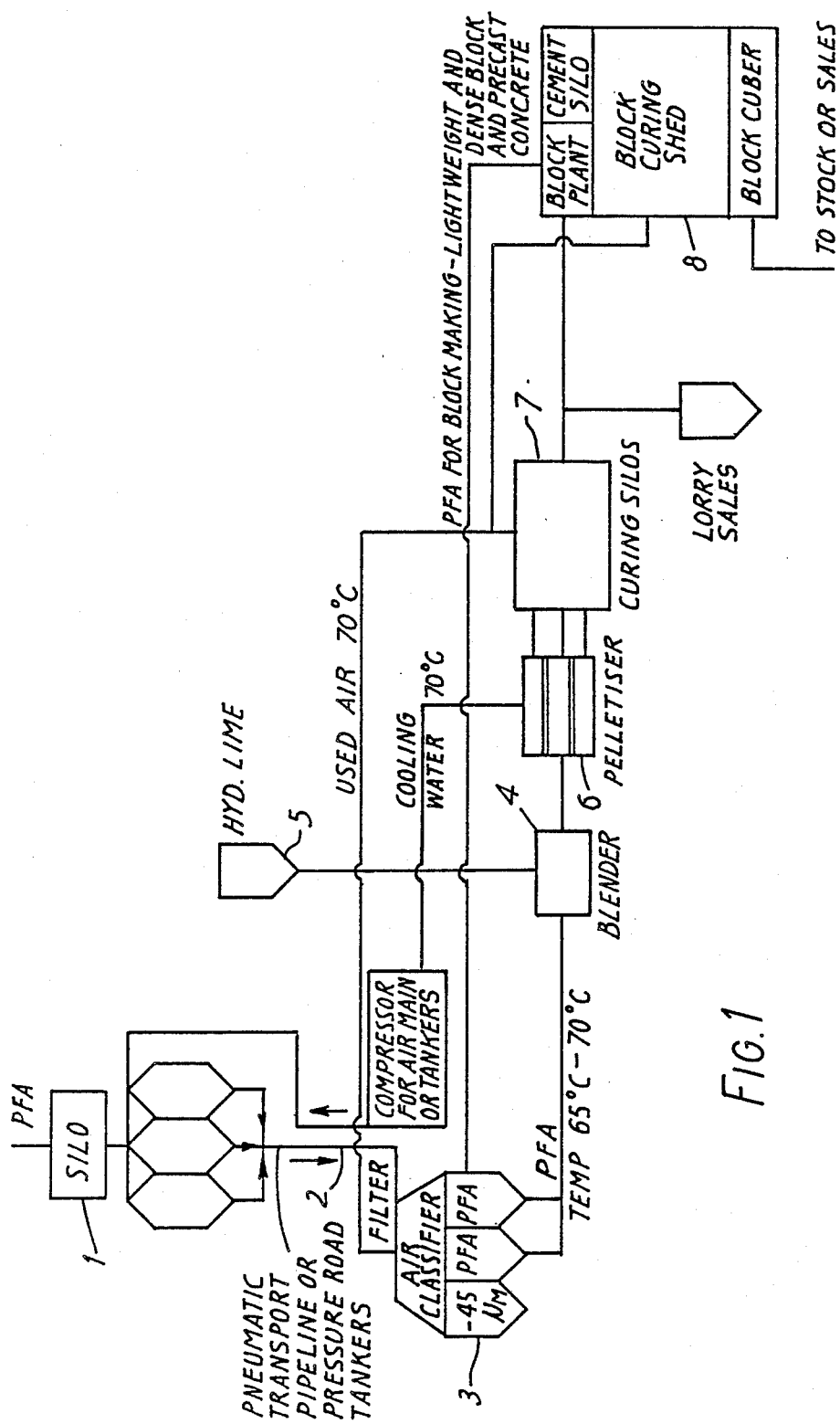

United States Patent [19]

Walker

[11] Patent Number: 4,770,831
[45] Date of Patent: * Sep. 13, 1988

[54] PROCESS FOR MANUFACTURING A LIGHTWEIGHT AGGREGATE

[75] Inventor: Bryan J. Walker, Bedford, England

[73] Assignee: Granulite Limited, England

[*] Notice: The portion of the term of this patent subsequent to Jul. 28, 2004 has been disclaimed.

[21] Appl. No.: 915,854

[22] Filed: Oct. 6, 1986

Related U.S. Application Data

[63] Continuation of Ser. No. 617,893, filed as PCT GB83/00248, Oct 3, 1983, pubished as WO84/01367, Apr. 12, 1984

[30] Foreign Application Priority Data

Oct. 1, 1982 [GB] United Kingdom ............... 8228182

[51] Int. Cl.⁴ ..................... C04B 18/02; C04B 40/02
[52] U.S. Cl. ............................. 264/82; 264/117; 264/118; 264/234; 264/345; 264/DIG. 35; 264/DIG. 49; 106/118; 106/120; 106/DIG. 1
[58] Field of Search .............. 264/DIG. 49, 123, 125, 264/117, 118, 234, 82, 345, DIG. 35; 106/118, 119, 120, DIG. 1

[56] References Cited

U.S. PATENT DOCUMENTS

| | | | |
|---|---|---|---|
| 2,564,690 | 8/1951 | Havelin et al. | 264/DIG. 49 |
| 3,192,060 | 6/1965 | Tilsen | 264/DIG. 49 |
| 3,854,968 | 12/1974 | Minnick et al. | 106/DIG. 1 |
| 4,018,619 | 4/1977 | Webster et al. | 106/120 |
| 4,105,463 | 8/1978 | Angelbeck | 106/120 |
| 4,313,762 | 2/1982 | Pound | 106/118 |
| 4,377,414 | 3/1983 | Buschmann | 106/118 |
| 4,490,178 | 12/1984 | Loggers et al. | 106/118 |

FOREIGN PATENT DOCUMENTS

| | | | |
|---|---|---|---|
| 2639655 | 3/1978 | Fed. Rep. of Germany | 106/DIG. 1 |
| 1354562 | 5/1974 | United Kingdom | 106/DIG. 1 |

OTHER PUBLICATIONS

Chemical Abstracts, vol. 92, No. 6, 2/80, Abstract No. 46437a.

Primary Examiner—Jan H. Silbaugh
Assistant Examiner—Hubert C. Lorin
Attorney, Agent, or Firm—Birch, Stewart, Kolasch & Birch

[57] ABSTRACT

Lightweight aggregate for use in the building industry is produced by pelletizing or granulating pulverized fuel ash or other siliceous material with a binder comprising lime in an amount less than 5% by weight based on the weight of the mixture of lime and siliceous material and curing the pellets or granules at a temperature within the range of from 35° C. to 100° C. in an atmosphere saturated with water vapor. The amount of lime added as binder is preferably within the range of from 1 to 4.5% by weight and curing temperature is preferably within the range of from 50° to 85° C. Preferably the pelletizing process is also carried out at an elevated temperature within the range of from 35° C. to 100° C.

15 Claims, 3 Drawing Sheets

PROCESS FOR MANUFACTURING A LIGHTWEIGHT AGGREGATE

This application is a continuation of application Ser. No. 617,093 filed as PCT GB83/00248 on Oct. 3, 1983, published as WO84/01367 on Apr. 12, 1984, now abandoned.

This invention relates to lightweight aggregates for use in the building industry and more especially in the manufacture of building blocks.

It has been proposed to make lightweight aggregate by pelletising pulverised fuel ash or other siliceous material in the presence of lime or cement. It has hitherto been thought that the amount of lime or cement required must amount to at least 5% based on the weight of the mixture of cement or lime and siliceous material and normally at least 7%, if the pellets and the blocks produced from them are to have adequate strength.

This invention is based on the observation that amounts of lime considerably less than the 5% required by the prior art can be used to produce pellets or granules of considerable strength, if after formation the pellets or granules are cured at a temperature within the range of 35° C. to 100° C. Preferably the process for the production of the pellets or granules is carried out at an elevated temperature. The strength of pellets, for example, produced using 2% of lime (calculated as CaO) in admixture with fly ash, after curing for 24 hours at 70° C. have a strength equivalent to similar pellets produced using 5% of cement in admixture with fly ash, cured for the same period.

The invention provides a process for the manufacture of lightweight aggregate which is suitable for use in the building industry which comprises blending a siliceous material with a binder comprising quicklime and/or hydrated lime in an amount less than 5% (calculated as CaO) based on the total dry weight of siliceous material and binder, forming the blend into granules or pellets, if necessary or desired with the addition of water, and curing or hardening the pellets or granules by maintaining them at a temperature within the range of from 35° C. to 100° C. in an atmosphere saturated with water vapour.

Preferably during the manufacture of the pellets or granules an elevated temperature within the range of from 35° C. to 100° C. is maintained. A particular advantage of the invention is that by use of hot fuel ash or other siliceous material diect from, for example, a power station and/or by utilizing the heat of slaking of quicklime, the process can be made self-sufficient in energy.

The amount of lime added as, or forming part of, the binder is preferably between 4.5 and 1% by weight, (expressed as calcium oxide) based on the dry weight of lime plus siliceous material. Water may be added to the blend in any amount necessary to give the consistency required for the chosen granule or pellet making process.

The pellets or granules may be hardened before further processing or they may be processed, for example, by moulding to a desired shape before hardening and then allowed to harden as a processed mass.

The hardening or curing temperature is preferably in the range of from 50° C. to 85° C. and a similar range of temperature is preferably used in the pelletising or granule making process.

The lightweight aggregate according to the invention is in the form of pellets or granules which may be produced for example by extrusion or by pelletising, either wet or dry. Preferably in any wet process hydrated lime is used which is produced by slaking quicklime substantially almost immediately before the lime is used in the process. When a dry pelletising process is used, the siliceous material may be mixed with quicklime and water sprayed thereon to slake the lime.

If desired, accelerators and/or dispersers may be added to the blend, such materials being known in the art. Accelerators that can be used are for example, calcium chloride and sodium hydroxide.

Preferably the siliceous material used in the process is pulverised fly ash direct from a power station, for example, at a temperature of say 65° to 70° C. The entrained heat in such fuel ash provides much of the heat which is desirable during the pelletising operation and this may be supplemented as indicated above by utilizing the heat of slaking of quicklime in addition to which hot air which inherently derives from the hot ash may provide a heated atmosphere for curing the pellets.

The process of the invention apart from its economic advantages provides a further advantage arising from the use of lime as binder, namely that the pellets or granules are much more resilient than those based on cement. This factor reduces breakage during handling and facilitates inter-particle binding and it also allows large moulded masses of the pellets or granules to be cut into desired smaller masses, for example, using a vibrating wire cutter.

Although the invention has basically been described with reference to the use of pulverised fly ash, any pulverised fuel ash can be used in the process, as indeed can any siliceous material in pulverised form providing that it will react with the lime to form hydrated calcium silicates.

The invention will now be described in greater detail by way of example with reference to the accompanying drawings of which the three figures are flow diagrams showing those variations of the process according to the invention.

As shown in FIG. 1 of the drawings, pulverised fly ash from a storage silo 1 at a power station at a temperature of say 65° C. to 75° C. is transferred by insulated pipeline 2 or insulated tanker to a classifier 3 where it is graded as to size. The graded fly ash which is still at a temperature of 65° C. to 70° C. is then passed to a blender 4 where it is mixed with hydrated lime from a storage tank 5 and thence to a pelletiser 6.

Following pelletising the pellets are passed to a curing silo 7 into which, if extra heat is needed, is fed the used hot air from the classifier 3. After curing at a temperature of 70° C. for 24 hours or so to allow full reaction between the lime and the siliceous material the pellets are either transported away passed a building block producing plant 8 wherein the pellets are mixed with cement and/or lime and, if desired, more fly ash, as binder, and formed into blocks.

Figure 2:
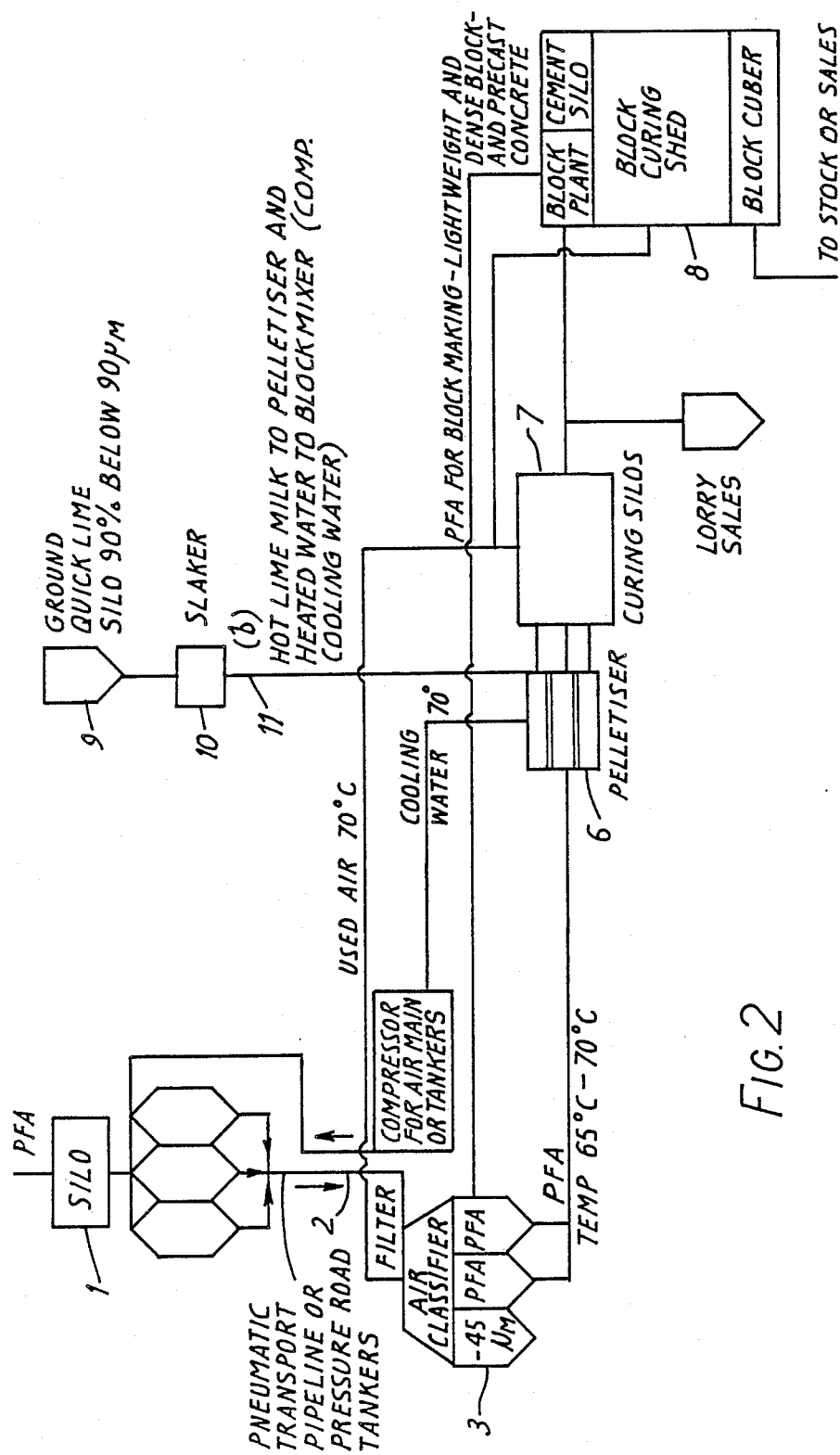

As shown in FIG. 2 the process is basically the same as that of FIG. 1 except that instead of hydrated lime being fed to blender 4, quicklime in silo 9 is slaked in slaker 10 and the hot milk of lime is fed throughline 11 to the pelletiser.

Figure 3:
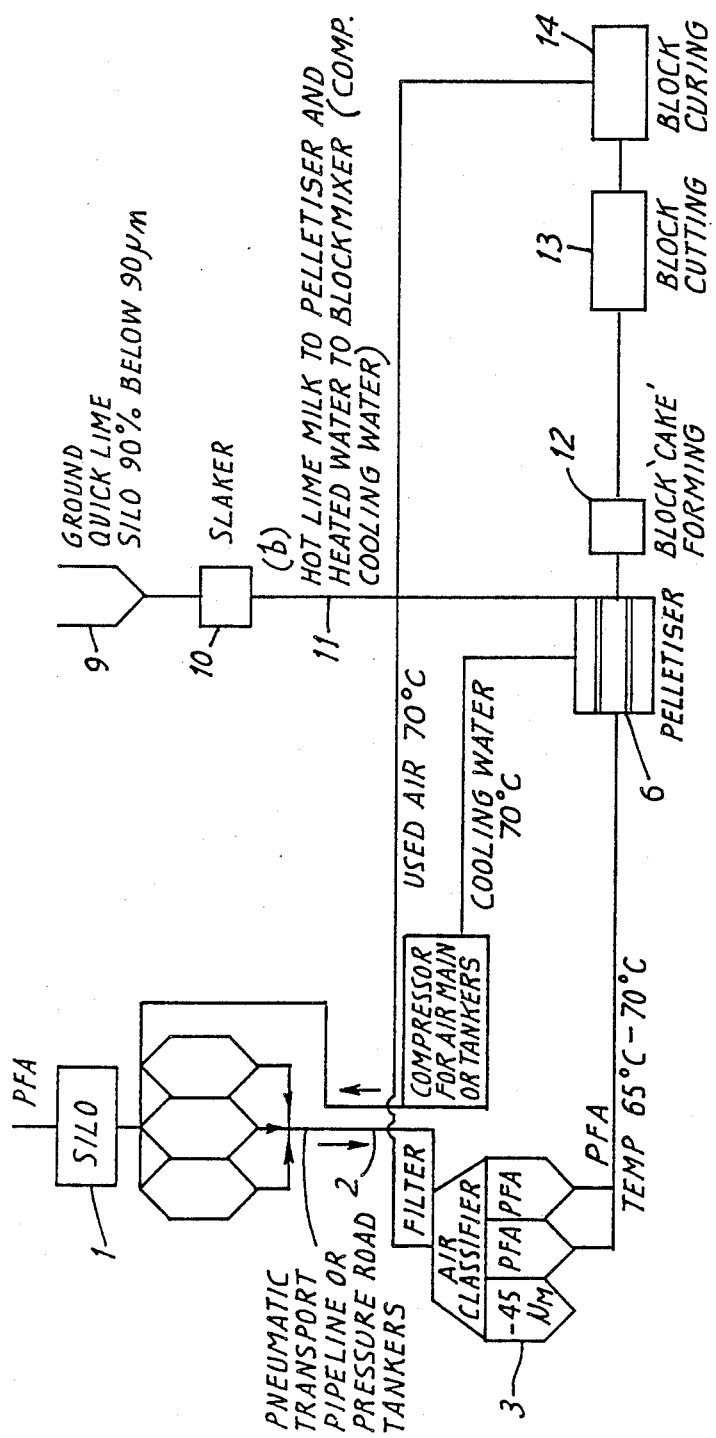

FIG. 3 shows a modification of the process of FIG. 2 in which the pellets from pelletiser 6 are fed to block forming plant 12 after which the green blocks are cut into smaller units at 13 and then passed to a hardening unit 14.

I claim:

1. A process for manufacturing a lightweight aggregate for use in the building industry, which comprises:
   (a) blending fly ash and an effective amount less than 5%, calculated as CaO, of quick lime, hydrated lime or mixtures thereof based on the total dry weight of fly ash and lime to increase the crushing strength of a pellet or granule formed therefrom;
   (b) forming the blend into granules or pellets with an effective amount of water to allow pelletization;
   (c) curing or hardening the pellets or granules at a temperature maintained within a range of from 35° to 100° C. in an atmosphere saturated with water vapor for a time sufficient to dry the pellets or granules and to increase the crushing strength of the pellets or granules.

2. The process according to claim 1 wherein the curing or hardening of the pellets or granules is at a temperature maintained within a range of from 35° C. to 85° C.

3. The process according to claim 1, wherein the hardening or curing temperature is within the range of from 50° C. to 85° C.

4. A process for manufacturing a lightweight aggregate for use in the building industry, which comprises:
   (a) blending siliceous material and an effective amount less than 5%, calculated as CaO, of quick lime, hydrated lime or mixtures thereof based on the total dry weight of siliceous material and lime to increase the crushing strength of a pellet or granule formed therefrom;
   (b) forming the blend into granules or pellets with an effective amount of water to allow pelletization;
   (c) curing or hardening the pellets or granules at a temperature maintained within a range of from 35° to 100° C. in an atmosphere saturated with water vapor for a time sufficient to dry the pellets or granules and to increase the crushing strength of the pellets or granules.

5. The process according to claim 4, wherein the pellets or granules are manufactured from siliceous material that retains heat from its method of production.

6. The process according to claim 4, wherein the siliceous material at least partially comprises hot fuel ash.

7. The process according to claim 4, wherein the siliceous material is pulverised fly ash.

8. The process according to claim 4, wherein the amount of lime is within the range of from 1 to 4.5% by weight, calculated as CaO, and based on the dry weight of lime plus siliceous material.

9. The process according to claim 4, wherein the pellets are processed by molding to form building materials before they are hardened or cured and are then hardened or cured as a processed mass.

10. The process according to claim 4, wherein the pellets or granules are produced by a wet process and the lime is produced by slaking quick lime which is then immediately used in the process.

11. The process according to claim 4, wherein during manufacture of the pellets or granules the temperature is within the range from about 50° C. to 85° C.

12. The process according to claim 4 wherein the lightweight aggregate comprises quick lime and siliceous material.

13. The process according to claim 4 wherein the lightweight aggregate comprises hydrated lime and siliceous material.

14. The process according to claim 4 wherein the lightweight aggregate comprises quick lime, hydrated lime and siliceous material.

15. The process according to claim 4 wherein the curing or hardening of the pellets or granules is at a temperature maintained within a range of from 35° C. to 85° C.

* * * * *